(12) United States Patent
D'Aurelio et al.

(10) Patent No.: US 7,325,238 B2
(45) Date of Patent: Jan. 29, 2008

(54) INTERFACE FOR DETERMINING THE SOURCE OF USER INPUT

(75) Inventors: Ryan James D'Aurelio, Seattle, WA (US); John Eric Elsbree, Redmond, WA (US); Jay Senior, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 10/394,618

(22) Filed: Mar. 21, 2003

(65) Prior Publication Data

US 2004/0187139 A1 Sep. 23, 2004

(51) Int. Cl.
*G06F 15/163* (2006.01)
*G06F 13/20* (2006.01)

(52) U.S. Cl. ............. 719/328; 719/322; 710/10; 710/100

(58) Field of Classification Search .......... 719/709
See application file for complete search history.

(56) References Cited

U.S. PATENT DOCUMENTS

| | | | |
|---|---|---|---|
| 5,819,107 A * | 10/1998 | Lichtman et al. ......... 710/8 |
| 5,890,011 A * | 3/1999 | Abbondanzio et al. ...... 710/9 |
| 6,008,921 A * | 12/1999 | Brusky et al. ............ 398/106 |
| 6,209,044 B1 * | 3/2001 | Vaughan ................ 710/14 |
| 6,281,880 B1 * | 8/2001 | Rose et al. ............. 345/158 |
| 6,292,172 B1 * | 9/2001 | Makhlouf .............. 345/157 |
| 6,313,851 B1 * | 11/2001 | Matthews et al. ........ 715/718 |
| 6,346,934 B1 * | 2/2002 | Wugofski ............... 345/158 |
| 6,539,437 B1 * | 3/2003 | Windheim et al. ....... 719/330 |
| 6,976,216 B1 * | 12/2005 | Peskin et al. ........... 715/716 |
| 7,102,691 B2 * | 9/2006 | Dischert et al. ........ 348/552 |
| 2003/0030660 A1 * | 2/2003 | Dischert et al. ........ 345/718 |
| 2004/0135819 A1 * | 7/2004 | Maa ..................... 345/840 |

* cited by examiner

*Primary Examiner*—William Thomson
*Assistant Examiner*—Abdou K Seye
(74) *Attorney, Agent, or Firm*—Shook, Hardy & Bacon, L.L.P.

(57) ABSTRACT

A method, interface, and medium are provided for causing a computer to respond to input based on the source of the input. The computer responds to identical input according to a device that generated the input. The method includes determining information about a receiving component that received the data and using that information to determine the source of input. The source of data input is coupled with the input to initiate a response by the computer. The response can be tailored to how the data was received.

22 Claims, 8 Drawing Sheets

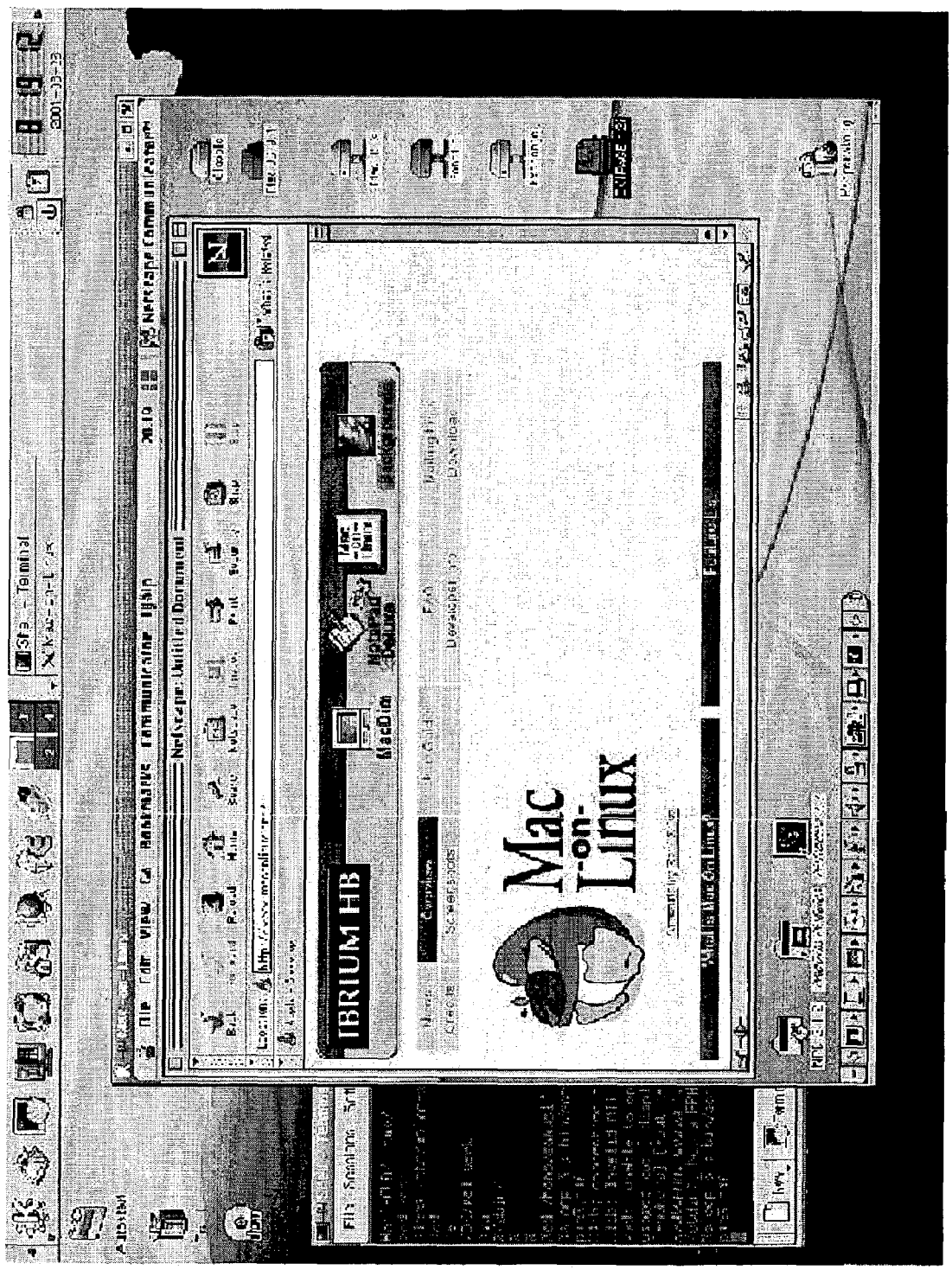
FIG. 3A - Prior Art

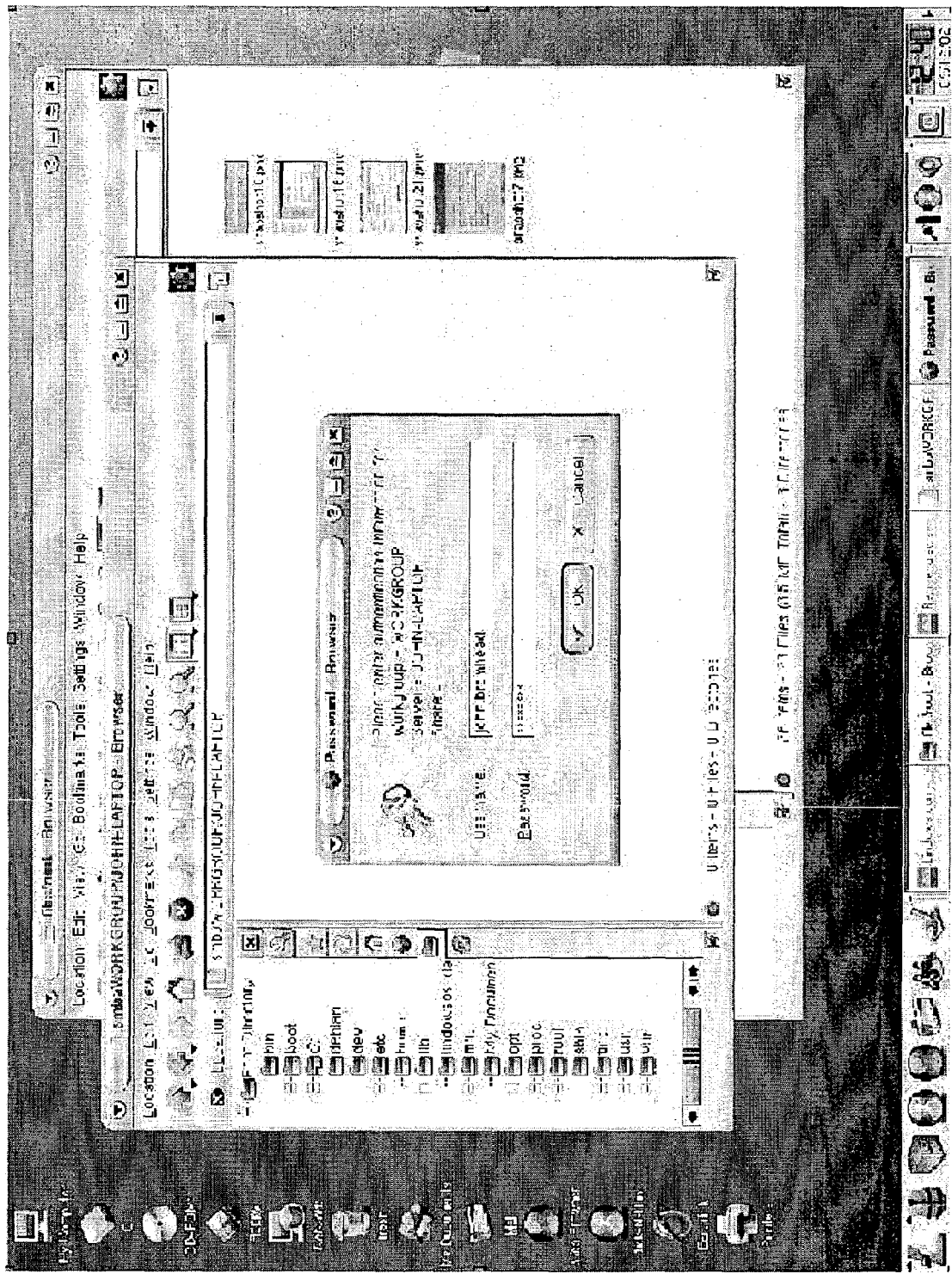
FIG. 3B - Prior Art

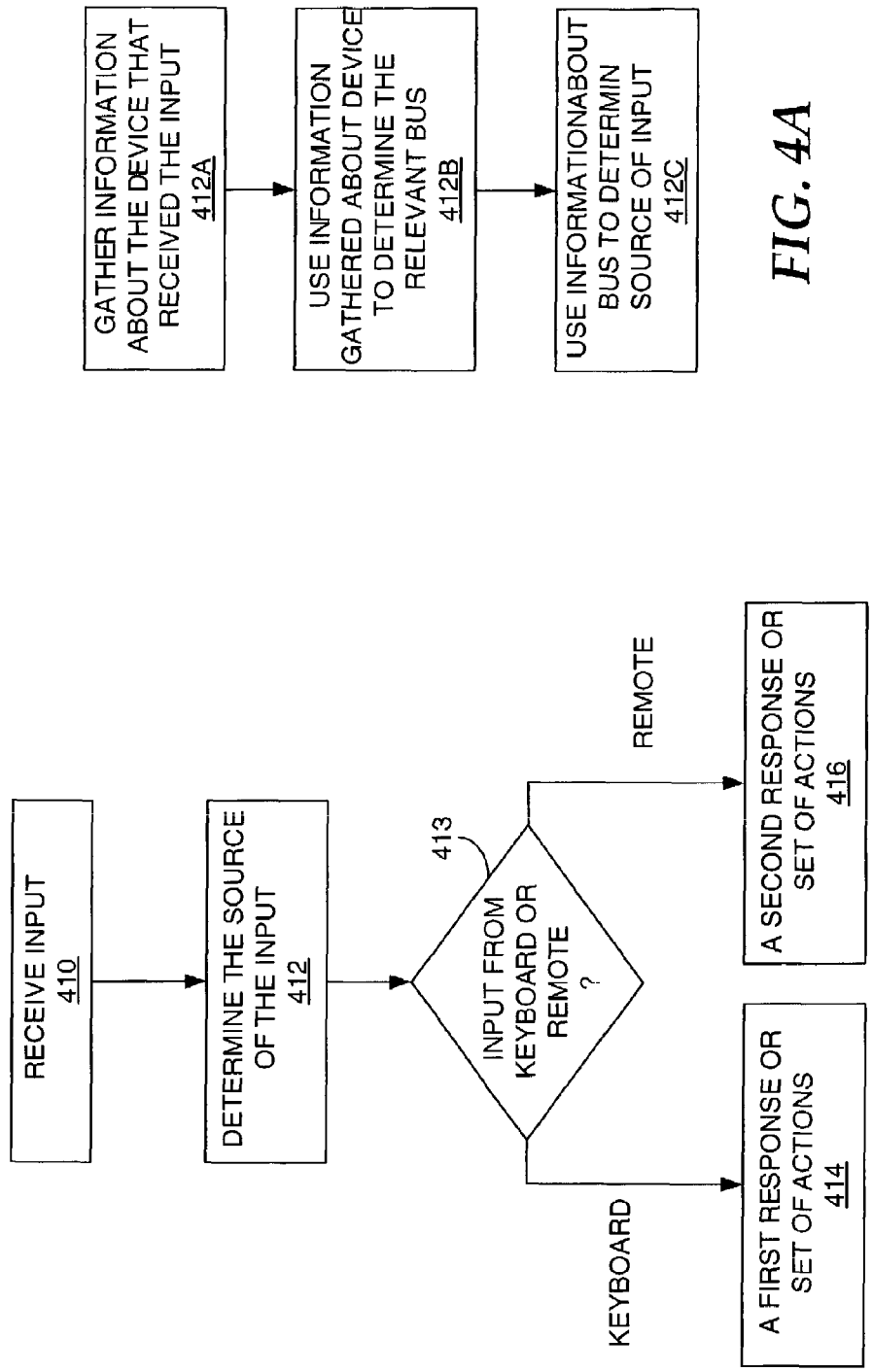

```
OnRawInput
{
    Receive a WM_INPUT command

Call GetRawInputData with RID_INPUT,
        Returns RAWINPUT structure

Call GetRawInputDeviceInfo ( RIDI_DEVICENAME),
        Returns device string name Parse string name Call SetupDiCreateDeviceInfoList, which sets up HDEVINFO Call SetupDiOpenDeviceInterface with the parsed devicename,
        Returns SP_DEVICE_INTERFACE_DATA Call SetupDiGetDeviceInterfaceDetail using SetupDiGetDeviceInterfaceDetail,
        Returns SP_DEVINFO_DATA Work up the parent chain to find the bus:

Call CM_Get_Parent with the DevInst in the SP_DEVINFO_DATA

Call CM_Get_DevNode_Registry_Property with the CM_DRP_SERVICE
}
```

```
OnRawInput
{
    Receive a WM_INPUT command

Call GetRawInputData with RID_INPUT,
        Returns RAWINPUT structure

If input is HID, then          ⎫
        Input is remote,           ⎬  610
    Endif                          ⎭

Call GetRawInputDeviceInfo (RIDI_DEVICENAME),
        Returns device string name Parse string name Call SetupDiCreateDeviceInfoList, which sets up HDEVINFO Call SetupDiOpenDeviceInterface with the parsed devicename,
        Returns SP_DEVICE_INTERFACE_DATA Call SetupDiGetDeviceInterfaceDetail using SetupDiGetDeviceInterfaceDetail,
        Returns SP_DEVINFO_DATA Work up the parent chain to find the bus:

Call CM_Get_Parent with the DevInst in the SP_DEVINFO_DATA

Call CM_Get_DevNode_Registry_Property with the CM_DRP_SERVICE
}
```

INTERFACE FOR DETERMINING THE SOURCE OF USER INPUT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to computer software application programming. More particularly, the present invention provides one or more application program interfaces or schemas that enable a computer to distinguish otherwise identical input commands based on the source of those commands and then respond accordingly.

BACKGROUND OF THE INVENTION

As general-purpose computing systems (computers) evolve into entertainment centerpieces, there is a need to solve problems associated with antiquated computer-usage paradigms. One such paradigm is the idea that computers should display a single interface and are to be operated from a close distance. For instance, a Distance User Interface (DUI) is described in the nonprovisional application entitled User Interface For Operating a Computer From a Distance, Ser. No. 10/174,619, filed on Jun. 19, 2002, by Parker, et al., and commonly assigned to the assignee of the present invention, incorporated by reference herein. The DUI invention provides an interface for operating a computer from across a room as opposed to within a couple of feet. Such an invention conserves resources by enabling a computer to replace a stereo receiver, television, VCR, media player, and more.

With an Internet and/or cable-TV connection, a computer equipped with a DUI can be used to watch television, record movies, and listen to radio programming by using a remote control from a distance. But using a remote control to control the functions of a general-purpose computing device can be problematic.

One potential method of operating a computer with a remote control is to associate dedicated key codes with each button of the remote control. This method allows a computer to easily distinguish between input received from a keyboard from input received via the remote control.

There are situations where it is desirable for a computer to act differently based on whether it receives commands from an attached keyboard (or mouse) or from another device, such as a remote control. As explained above in Parker et al., computers can present a first user interface when a user is close, within a couple feet or so, and a second user interface when the user is operating the computer from across the room, a DUI. A better computing experience can be offered to a user if the computer can respond, while presenting a DUI, to user input received from a nearby user differently than user input received from a more distant user.

Because it is desirous for a computer to respond based on a source of data input, the computer must be able to distinguish between "two-foot user input" and "ten-foot user input" even when displaying a DUI. These terms are not intended to literally mean two and ten feet, rather they are intended to relate to the general concepts of operating a computer nearby versus from a distance. Because the dedicated-key-codes method relies on key codes uniquely associated and differentiated from conventional-keyboard key codes, a computer could easily recognize a source of user input based on the key codes received.

Such a solution, however, requires an inefficient use of resources. Key codes for conventional keyboards already exist. These key codes often exist as virtual-key codes. As is well known, a virtual-key code is usually an ASCII or hexadecimal code. For instance, a hexadecimal code of "31h" may correspond to the "1" key. The "ESC" key can be represented by "1Bh." That is, "1B" hexadecimal. Modern keyboards have expanded beyond the 101-key keyboard to include additional keys associated with certain applications or events, such as "refresh." Mouse clicks are also represented using key codes.

Because key codes currently exist and are widely accepted in the industry, having a remote control emit signals that correspond to conventional key codes would ease a programmer's unwarranted burden of programming a computer to respond to unique remote-control key codes. If unique remote-control key codes were used, then a "1" on the remote control would not have the same key code as a "1" on the keyboard. Programs coded to respond to a keyboard "1" would have to be modified to respond identically to another key code, that which corresponds to the remote-control "1." Moreover, an industry would need to agree on common remote-control key-codes so that programs of the computer can respond as intended.

Because general-purpose computing devices, operating systems, and applications are already configured to interpret key codes that exist today, it would be greatly beneficial if a computer remote control used conventional key codes to transmit data input. Such common key-code usage, however, presents the problem of not being able to distinguish keyboard (or mouse) key codes from remote-control key codes. As previously mentioned, there may be occurrences where it is desirable for a key code received from a keyboard to cause a different response to the exact same key code received from a remote control. Accordingly, a need exists to be able to distinguish data input based on the source that generated the data input.

SUMMARY OF THE INVENTION

The present invention generally relates to a method for enabling a computer to distinguish between identical data inputs based on the source of those data inputs. For instance, one type of data input into computers is by way of key codes, historically sent by keyboards. Today, as the computer moves from the home office to the living room, it may be operated by a remote control. Preferably, a remote control emits signals that correspond to conventional key codes. But programmers may wish to program a computer to respond to input commands received from a keyboard differently than to the same input commands received from a remote control. For example, an "ESC" key code received from a keyboard may cause a different response than the same "ESC" key code received from a remote control. The present invention provides a method, system, and interface that enables a computer to respond to input according to a source of that input.

The present invention has several practical applications in the technical arts, not limited to simplifying the modification of existing programs to allow them to interact with an input device besides a keyboard (such as a remote control) and making computers more intuitive to operate as their functionality increases.

BRIEF DESCRIPTION OF THE SEVERAL VIEWS OF THE DRAWINGS

The present invention is described in detail below with reference to the attached drawing figures, wherein:

FIGS. 3A & 3B are screenshots of a graphical user interface in "windowed" mode;

FIG. 4 is a flow diagram illustrating the functionality of the present invention;

FIG. 4A is a flow diagram illustrating a preferred method for determining a source of user input;

FIG. 5 provides illustrative pseudocode for implementing the present invention; and FIG. 6 provides optimized illustrative pseudocode for implementing a preferred embodiment of the present invention.

DETAILED DESCRIPTION OF THE INVENTION

The present invention enables a computer to respond according to the source of data received. Even in communication of what would otherwise be identical data from different sources, such as a keyboard rather than a remote, the present invention enables a computer to respond differently based on what device generated the data input. In one embodiment, the present invention distinguishes between input received from a remote-control device from input of a keyboard or mouse. An exemplary operating environment for the present invention is described below.

Exemplary Operating Environment

Figure 1:
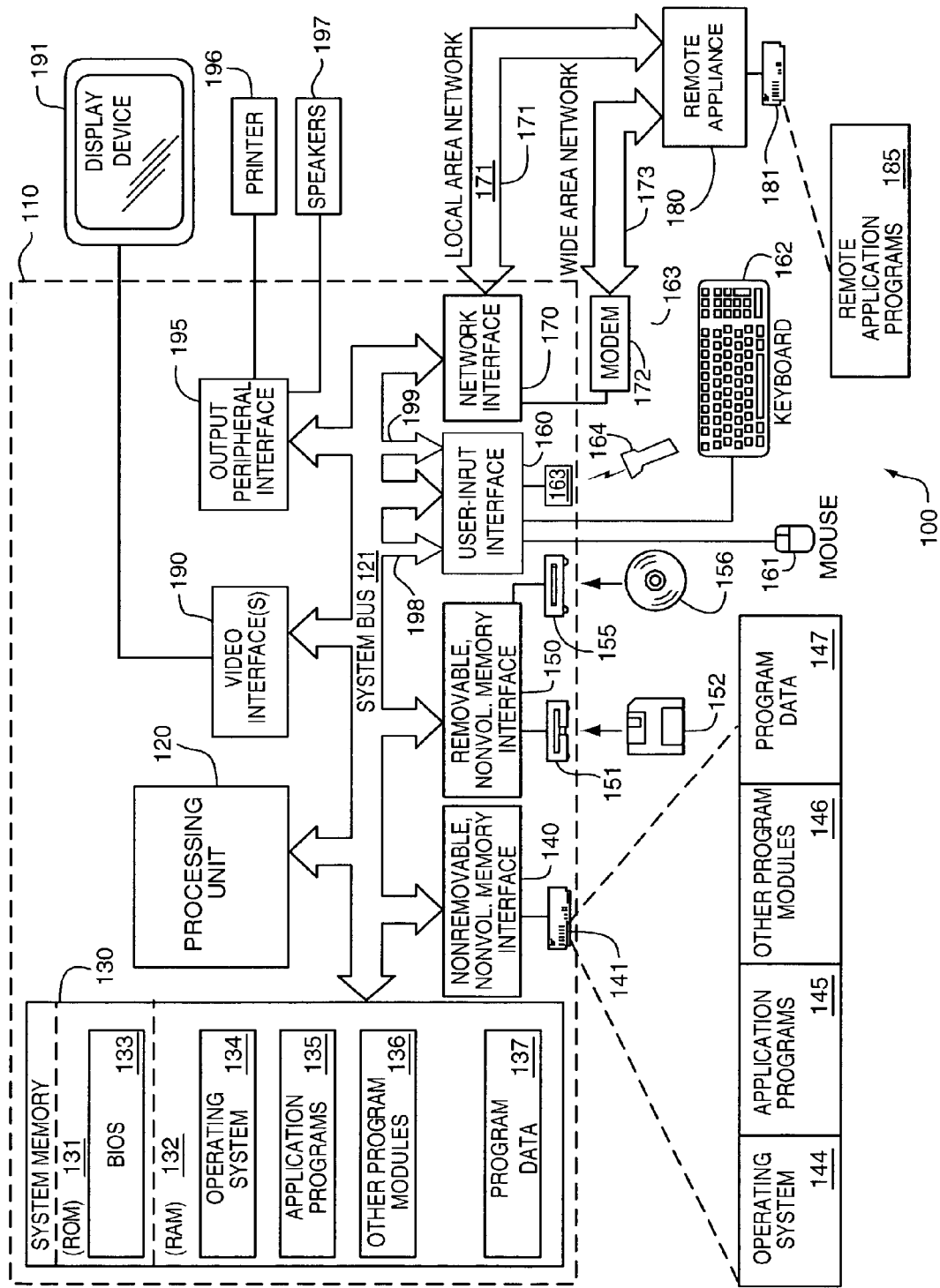
FIG. 1 is a block diagram of a computing-system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM_; Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical-disc drive 155 that reads from or writes to a removable, nonvolatile optical disc 156 such as a CD-ROM or other optical media. Other removable/non-removable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disk drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source 164 such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB) 198, or infrared (IR) bus 199.

A display device 191 is also connected to the system bus 121 via an interface, such as a video interface 190. Display device 191 can be any device to display the output of computer 110 not limited to a monitor, an LCD screen, a TFT screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

User-Input Differentiation

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

In a preferred embodiment, the present invention distinguishes between nearby input and distance input by distinguishing between keyboard input and remote control input. The present invention should not, however, be construed in any way to be limited to distinguishing between keyboard input and remote-control input. The present invention is widely applicable to distinguishing between a variety of input sources and is generally applicable to at least operating systems in general. A discussion follows with reference to a preferred embodiment to convey the spirit and functionality of the invention in a specific application. Upon reading this disclosure, a skilled artisan would appreciate alternative ways of effecting the same functionality and alternative applications of the present invention, all of which are contemplated within the scope of the claims.

Figure 2A:
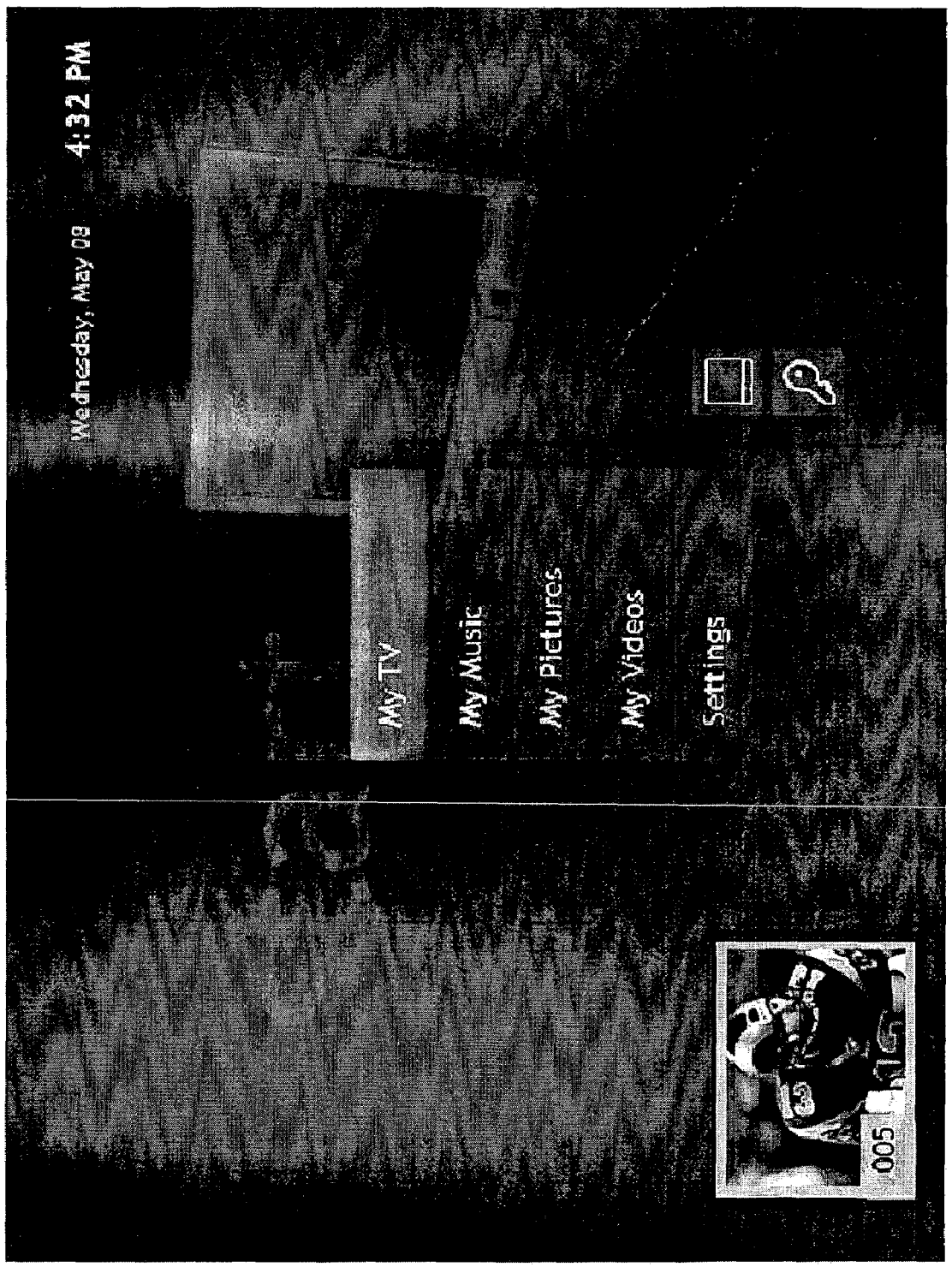
FIGS. 2A & 2B are screenshots of a DUI.
Figure 2B:
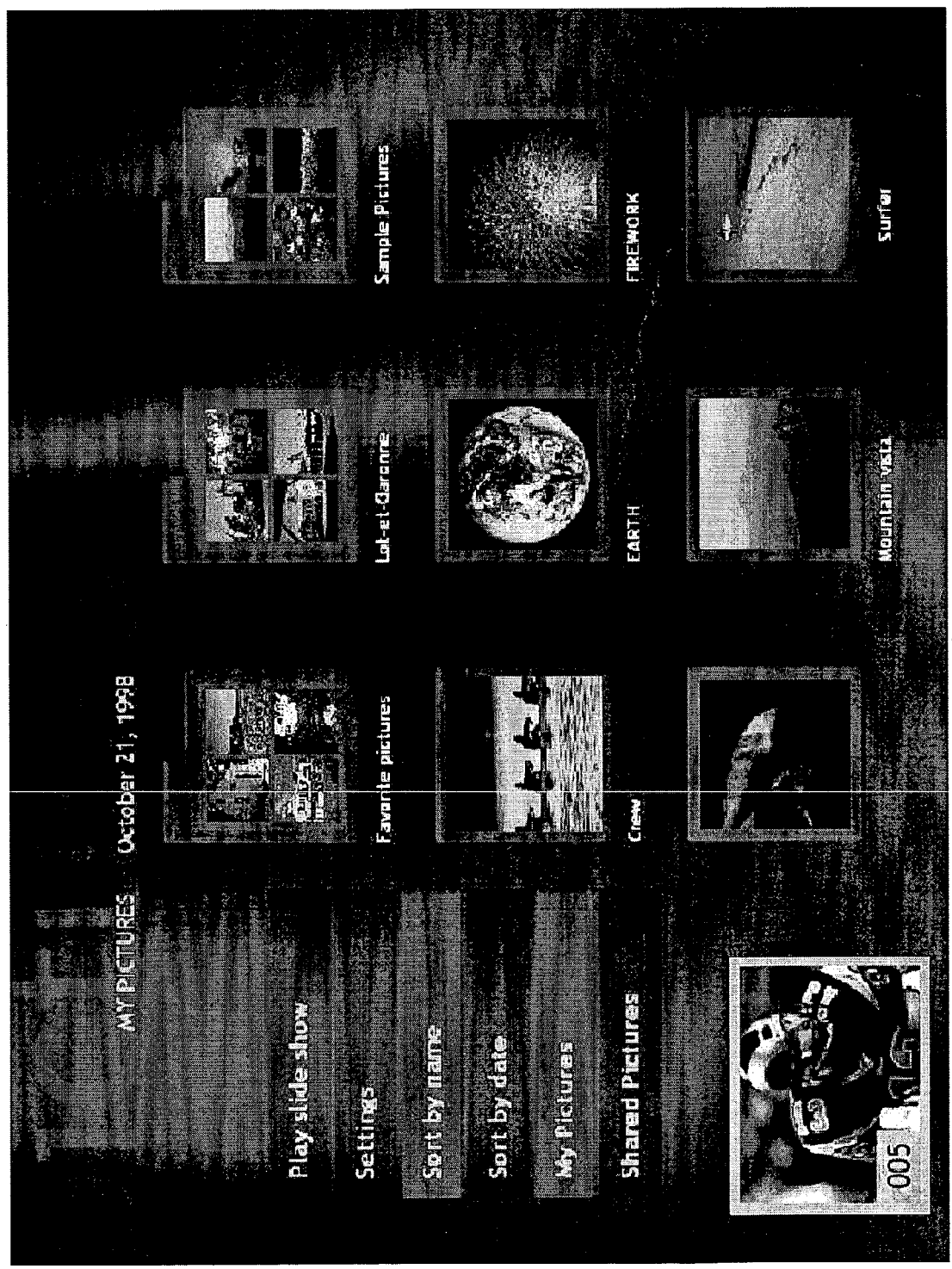

An illustrative application of the present invention is provided with reference to a computing environment having a Distance User Interface (DUI). A DUI can be provided as an overlay of a "windowed" interface. An exemplary DUI is provided in the aforementioned nonprovisional application having Ser. No. 10/174,619. Two exemplary screen shots of a DUI are provided in FIGS. 2A & 2B. A DUI can have tens or hundreds of screens. The two screen shots illustrate only two screens of a DUI, which is one form or state of a graphical user interface. FIGS. 2A & 2B are included to convey the concept of a computer operable from across a room, having specially designed buttons, highlights, controls, and feedback options.

In contrast, the screen shots of FIGS. 3A & 3B illustrate a conventional user interface having what is termed a "windowed" interface. Although a DUI can display content in windows, a "windowed" interface, as the term is used herein, is an interface having controls that contemplate a nearby user and is not designed to facilitate computer operation from a distance, such as from across a room. In a preferred embodiment, the present invention is practiced in a computing environment offering a DUI that when toggled off presents a conventionally oriented user interface, or "windowed" interface. Referring to these two types of user interfaces helps explain the functionality of the present invention.

In explaining the functionality of the various code segments used by the present invention, certain exemplary functions will be provided. These code segments are not exhaustive and are not indented to narrow the scope of the present invention. Rather, these code segments are includes to illustrate one of a myriad of ways of accomplishing the functionality described. Moreover, with respect to the code segments included herein, more detailed information related to syntax, parameters, and general implementation guidelines can be found with reference to the MICROSOFT DEVELOPER'S NETWORK (MSDN®). MSDN® is available online at http:htt:/www.msdn.microsoft.com/.

FIG. 4 is a flow diagram depicting an embodiment of the functionality carried out by the present invention. At a step 410, input is received by the computer. Input can be received through an input-receiving device, such as the various devices coupled to user-input interface 160. For example, mouse 161 receives input from one or more button presses, while keyboard 162 receives input from a user pressing and depressing the various keys. Wireless-input-reception component 163 receives input via wireless source 164, which communicates the input information to computer 110. With the input received, details about where and how the input was received can be obtained. Thus, the source of the input can be determined at a step 412. The present invention allows a determination to be made regarding the input source, even where the actual data received in a first manner is identical to data received in a second manner.

Consider the "Enter" key. One way of communicating that the "Enter" key has been selected is to transmit a virtual-key code. Other ways, such as transferring an ASCII code, also exist. The virtual-key code associated with "Enter" is "0D." Unless stated otherwise, all key codes included herein are in the hexadecimal-numbering system. Thus, one skilled in the art would appreciated that "0D" is read "zero-D hex." Key code "0D" may be communicated to computer system 100 using a variety of devices such as a keyboard, remote control, mouse, trackball, joystick, and by other such peripherals. Irrespective of which peripheral generates the key code, the key code is the same.

The present invention enables computer system 100 to distinguish identical data-input commands based on the source of those commands. An "Enter" command from a keyboard can be distinguished from an "Enter" command from a remote control even though the two commands are both "0D." Similarly, any data values can be distinguished based on the source that generated the input.

FIG. 4A is an exemplary method for accomplishing step 412 in determining the source of data input. At a step 412A, information is gathered about the device that received the input. The nonexhaustive list above provides but a few types of input devices by which data received from a user might be communicated to computer 110. The present invention includes computer-executable instructions that gather information about the input-receiving device. Much information can be gathered about a device coupled to a computer.

The information about the input-receiving device can be used to determine which bus inside computer 110 communicates the input at a step 412B. Exemplary buses include the IR bus 199 and USB bus 198. Skilled artisans will appreciate that FIG. 1 does not attempt to depict even a small portion of the buses involved in computer 110. Buses are built upon buses in computers. In one embodiment, the information gathered can be used to return the service that is running on the bus that communicated the input. Here, "service" refers to a program or routine that provides support to other programs, particularly at a low (close to the hardware) level. Accordingly, information about the bus can be used to determine the source of input at a step 412C. For example, if the input was communicated across the IR bus 199, then the input came from a remote control, or other wireless transmitter.

Returning to FIG. 4, progress continues at a step 413 by determining whether input was received via keyboard 162 or remote control 164. Although step 413 illustrates a decision made between remote-control input and keyboard input, the present invention should not be construed as distinguishing between only keyboard input and remote-control input. Based on the information gathered about the receiving device or service, many more distinguishments can be made. Thus, one or more actions can be initiated based on the input in conjunction with the source of the input.

A first response or set of actions 414 can be carried out if input was received via keyboard 162. Alternatively, a second response or set of actions 416 can be carried out if input was received by remote control 164. Note, that first response from set 414 may also be the same as a second response from set 416, but the present invention offers the ability for the computer system 100 to respond differently to identical input.

The computer is thus able to distinguish nearby-user input from distance-user input, even though the input is otherwise identical but for the device that generated the input. Actions that are more applicable in response to nearby input can be implemented using the present invention. A few examples, merely to illustrate the concept, follow.

In an exemplary environment where input can be received from a user by either a keyboard 162 or a wireless device, such as remote control 164, the following example depicts a varied computer response according to which device generated the input. One possible type of input can be a virtual-key code. For this example, both remote control 164 and keyboard 162 are configured to transmit an "Enter" virtual-key code. Codes sent by remote control 164 can be received by wireless-input-reception component 163. In a preferred embodiment, the present invention is practiced when the computer displays a DUI, which is described above.

In such an environment, even when the computer is presenting a DUI, it may be resourceful to respond to nearby-user input differently than to distance-user input. When the "Enter" key code is generated by keyboard 162, the computer 110 may respond in a manner different from when the same "Enter" key code is generated by remote control 164. For example, the remote control 164 may be equipped with a button that jumps to the last channel or station.

A "last" button can be implemented by transmitting the "Enter" key code from remote control 164. Thus, when an "Enter" code is received via the remote control, the user jumps to a previously viewed media experience. While such a feature is intuitive when used in conjunction with remote control 164, it is not as intuitive when used in conjunction with keyboard 162. Accordingly, an "Enter" received via keyboard 162 would not jump a user to a previously viewed media experience. The "Enter" of keyboard 162 may conclude a text entry or the like. Thus, the present invention enables returning to a previously viewed media experience if a set of commands are received by remote control 164 but not returning to a previously viewed media experience if the same set of input commands were received by an input device such as keyboard 162.

Another example is provided with reference to the "Esc" or "escape" key. When the "Esc" key code is communicated via keyboard 162, the DUI is toggled off—the user interface would return to "windowed mode," which is shown by the illustrative screenshots of FIGS. 3A & 3B. If, however, the "Esc" key code is generated by remote control 164, then a delete or backspace function is performed. For instance, characters entered into a "guide" display of the DUI can be erased. Recorded media could be deleted as well. In such an embodiment, remote control 164 would have a "delete" or "clear" button that was configured to transmit the "Esc" key code. When the "Esc" key code is received from the remote control 164 by computer 110, its function will be mapped to a delete function. An "Esc" key code received from keyboard 162 toggles off the DUI in this embodiment.

From the foregoing explanation, one skilled in the art would appreciate that any set of alternatives can be followed in response to determining a source of input. A "Tab" received by keyboard 162 may cause a first response whereas a "Tab" received by remote control 164 may cause a second response. The responses include a variety of options such as launching a program or program segment; modifying a user interface; responding to a key command based on when the key is pressed (key down) rather than depressed (key up); or performing an input/output function. Any act performable by system 100 is a potential alternative.

While code variations abound for implementing the functionality described above and depicted in FIGS. 4 & 4A, illustrative pseudocode is provided in FIG. 5. Although the pseudocode of FIG. 5 is provided in association with a WINDOWS® implementation, those skilled in the art would appreciate the cross-applicability to other operating systems based on the function performed by the code segment. FIG. 5 is not intended to be a specification-grade code listing. But one skilled in the art would appreciate that the specific syntax, function parameters, and module implementations—beyond the novel functionality accomplished by the instruction group as a whole—are more fully explained in Microsoft's MSDN®. Again, the pseudocode of FIG. 5 depicts one of potentially unlimited embodiments of the present invention. The scope of the present invention lies not in the pseudocode of FIG. 5, but rather in the claims below.

FIG. 5 illustrates that the present invention includes instructions for receiving input commands that correspond to one or more conventional keyboard strokes, or other form of data input. Instructions are also included for determining a source of the input commands and for initiating an action based on a combination of the input commands and the source of input commands.

In some embodiments, depending upon which of the various operating systems the present invention is being practiced, the application may not be designated to receive input commands. To the extent such situation is applicable, preliminary commands can be executed to facilitate the present invention's reception of input commands. As explained earlier, the preferred embodiment, although not limited to, is being explained within the context of a WINDOWS® operating environment. These commands are executed outside the pseudocode depicted in FIG. 5. An exemplary method for accomplishing this is to register for RawInput on the keyboard/IR collection and consumer collection. In one embodiment, the following method accomplishes this functionality: RegisterRawInputDevices (IN PCRAWINPUTDEVICE pRawInputDevices, IN UINT uiNumDevices, IN UINT cbSize); where pRawInputDevices is an array of PCRAWINPUTDEVICEs that are to be registered for. Those skilled in the art will appreciate alternative ways to notify the operating system that a module is to receive input. The pseudocode of FIG. 5 is processing that takes place within the aforementioned OnRawInput.

Accordingly, each time a WM_INPUT command is received, a call is made to GetRawInputData with RID_INPUT to return the RAWINPUT structure. GetRawInputDeviceInfo is called with the RIDI_DEVICENAME parameter, which will return a string name of the device. The sting name is parses for form. Next, a call is made to SetupDiCreateDeviceInfoList, which sets up the HDEVINFO. Calling SetupDiOpenDeviceInterface with the parsed device name will provide SP_DEVICE_INTERFACE_DATA. Using SP_DEVICE_INTERFACE_DATA, the present invention calls SetupDiGetDeviceInterfaceDetail to get the SP_DEVINFO_DATA. Working up the parent chain, the specific bus information can be retrieved. The present invention calls CM_Get_Parent with the DevInst in the SP_DEVINFO_DATA. CM_Get_DevNode_Registry_Property is called with the CM_DRP_SERVICE flag to return the service that is running on the bus that returned the input.

FIG. 6 depicts pseudocode of a preferred embodiment that includes additional code 610, which optimizes the pseudocode of FIG. 5 by performing a first check to determine whether input was a nonkeyboard code. If so, the input can be assumed to be from remote control 164 in this embodiment.

As can be understood, the present invention described herein enables a computer to distinguish input based on the source of the input. The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well-adapted to attain the ends set forth above, together with other advantages which are obvious and inherent to the system and method. It will be understood that certain features and subcombinations are of utility and may be employed without reference to other features and subcombinations. This is contemplated and within the scope of the claims.

The invention claimed is:

1. One or more computer-storage media having computer-readable instructions embodied thereon for causing a general-purpose computing device that can operate in a first user-interface mode or a second user-interface mode to perform a method of responding to one or more input commands ("input") differently based on a source of the input, the method comprising:
    receiving said input while presenting data in said first user-interface mode;
    determining a service that was invoked in connection with processing the input, which includes determining which of a plurality of buses was utilized to receive said input, wherein one of said plurality of buses includes an infrared bus, and wherein other of said plurality of buses are not an infrared bus;
    based on said service invoked, determining whether said input was received from a device wired to said computing device versus from a wireless device, which includes determining whether the input was received from a wireless remote control or from a wired keyboard; and
    without transitioning from said first user-interface mode to said second user-interface mode,
    1) performing a first task if said input is received by way of the device wired to said computing device, but
    2) performing a second task if the same input was received by way of the wireless device.

2. The media of claim 1, wherein receiving input comprises receiving the one or more input commands from a wireless device or wired device.

3. The media of claim 1, wherein performing said first task if said input is received by way of a device wired to said computing device includes signaling an end of entering a character string; and performing said second task if the same input was received by way of a wireless device includes reverting to a previously viewed media experience.

4. One of more computer-storage media having computer-useable instructions embodied thereon for performing a method for processing data according to the source, of the data in a general-purpose computing environment that includes at least two user-interface modes, the method comprising:

in a first user-interface mode, receiving data through an input-receiving device;

gathering information about the service that was invoked as a result of receiving data through the input-receiving device, which includes determining which of a plurality of buses was utilized to receive said data, wherein one of said plurality of buses includes an infrared bus, and wherein other of said plurality of buses are not an infrared bus;

determining from the gathered information whether the data was communicated via a wireless-signal-receiving bus or a wired-signal-receiving bus of a computer, which includes determining whether the data was received from a wireless remote control or from a wired keyboard; and if the data input was received via the wireless-signal-receiving bus, then initiating a first process in said first user-interface mode, but if the data input was not received via the infrared bus then, without transitioning from said first user-interface mode into a second user-interface mode, initiating a second process that is different from said first process.

5. The media of claim 4, wherein the first process comprises responding a first way to receiving an "enter" code; and wherein said second process includes responding in a second way to said same "enter" code that is different than said first way.

6. The media of claim 4, wherein the first process comprises responding to the data input incident to receiving a key-up indication, and the second process comprises responding to the data input incident to receiving a key-down indication.

7. The media of claim 4, wherein the first process comprises directing the computer to present a previously observed media experience, and the second process does not direct the computer to present a previous media experience.

8. A set of application program interfaces (API set) that perform one or more functions based on a source of user input, the API set embodied on one or more computer-storage media for execution in conjunction with one or more code segments on a general-purpose computing device capable of presenting data in a first user-interface mode and in a second user-interface mode having a plurality of buses, the API set comprising:

a first interface that receives a user-input command while in a first user-interface mode;

a second interface that determines the source of the user-input command based on a service invoked as a result of receiving the user-input command, which includes determining which of a plurality of buses was utilized to receive said input, wherein one of said plurality of buses includes an infrared bus, and wherein other of said plurality of buses are not an infrared bus; and a third interface that performs the one or more functions in said first user-interface mode without transitioning to said second user-interface mode in response to the user-input command based on the service invoked as a result of receiving the user-input command, but performs one or more other functions without transitioning to said second user-interface mode based on the service invoked as a result of receiving the user-input command indicating a different source, wherein basing a decision on the service mode invoked includes determining whether said input was received from a device wired to said computing device versus from a wireless device.

9. The API set of claim 8, wherein the second interface comprises computer code for determining a component within the computer that received the user-input command.

10. The API set of claim 9, wherein the second interface further comprises computer code for determining a bus within the computing device that is associated with receiving the user-input command.

11. The API set of claim 9, wherein the third interface that performs the one of more functions includes a mapping component to perform a first action if the user-input command was determined to be received by the infrared bus or perform a second action if the user-input command was determined to not have been received by the infrared bus.

12. One or more computer-storage media having computer-readable instructions embodied thereon for causing a general-purpose computing device that can present data in a first user-interface mode and a second user-interface mode based on a source of an input command, the method comprising;

in a first user-interface mode, determining a service that was invoked to receive the input command; and if the input command was received from a wireless source, causing the computing device to perform a first function without transitioning from said first user-interface mode; but if the input command was received from a source tethered to the computer, causing the computer to perform a second function that is different from said first function, but which is still performed without transitioning from said first user-interface mode to said second user-interface modes, wherein a determination is made as to whether the input command was received from a wireless source includes determining a service that was invoked in connection with processing the input command, which includes determining which of a plurality of buses was utilized to receive said input command, wherein one of said plurality of buses includes an infrared bus, and wherein other of said plurality of buses are not an infrared bus; and based on said service invoked, determining whether said input command was received from a device wired to said computing device versus from a wireless device.

13. The media of claim 12, wherein determining the service that was invoked comprises identifying which of a plurality of input devices communicatively coupled to the computing device received the input command.

14. The media of claim 13, wherein identifying which of the plurality of input devices comprises determining which bus within the computing device communicated the input command.

15. The media of claim 14, wherein the first function includes responding to the input command in response to receiving a key-up indication, and the second function includes responding to the input command in response to receiving a key-down indication.

16. One or more computer-storage media having computer-useable instructions embodied thereon that enable a general-purpose computing device, equipped with a plurality of input devices, to respond to data on a source that generated the data, comprising:
a first component to determine information about which of the plurality of input devices received the data;
a second component to determine a service that was invoked in connection with processing the data, which includes determining which of a plurality of buses was utilized to receive said data, wherein one of said plurality of buses includes an infrared bus, and wherein other of said plurality of buses are not an infrared bus; and
a third component to determine a source of the data in response to determining the bus associated with receiving the data such that a first action is carried out in a first user-interface mode if said data is received by way of a wired device, but a second action, which is different from said first action, is carried out while still in said first user-interface mode if the same data is received by way of a wireless device, wherein the source of the data is determined by determining whether said data was received from a device wired to said computing device versus from a wireless device.

17. One or more computer-storage media having computer-useable instructions embodied thereon for causing a computer system that can present at least two modes of user interfaces to perform a method of mapping key codes, the method comprising:
receiving one or more key codes in a first user-interface mode;
retrieving information about a service invoked as a result of receiving the one or more key codes to determine how the one or more key codes were received, wherein retrieving said information includes determining the service that was invoked in connection with processing the key codes, which includes determining which of a plurality of buses was utilized to receive said key codes, wherein one of said plurality of buses includes an infrared bus, and wherein other of said plurality of buses are not an infrared bus; and
based on said service invoked, determining whether said input was received from a device wired to said. computing device versus from a wireless device, initiating one of a plurality of processes in said first user-interface mode, and without transition to another user-interface mode, based on the retrieved input information.

18. The media of claim 17, wherein receiving one or more key codes includes receiving a programmatic representation of a key command.

19. The media of claim 18, wherein the programmatic representation of a key command includes a selection from the following:
an ASCII code corresponding to an input action;
a virtual-key code;
a symbolic constant name;
hexadecimal values; and
a keyboard equivalent recognizable by an operating system of a computer.

20. The media of claim 19, wherein information about the service invoked includes information about what bus of the computer received the key code.

21. The media of claim 20, wherein initiating one of a plurality of processes includes initiating a first process if the information about the service invoked indicates that the key code was received by a wireless-transmission device or a second process if the information about the service invoked indicates that the key code was received by a wired device.

22. A computing device programmed to operate in a first user-interface or a second user-interface mode, and to perform different tasks in response to data received through a wireless-input-reception component than from the same data received through a wired-input-reception component while maintaining said first user-interface mode and not transitioning to said second user-interface mode, the computing device comprising:
a first data bus coupled to a first input-receiving device;
a second data bus coupled to a second input-receiving device; and
one or more computer-storage media having computer-executable instructions embodied thereon that make up a data-input-determination component that analyzes software components utilized in receiving the data to determine from which bus the data arrived by determining a service that was invoked in connection with processing the data, which includes determining which of a plurality of buses was utilized to receive said data and based on said service invoked, determining whether said data was received from a device wired to said computing device versus from a wireless device, wherein one of said plurality of buses includes an infrared bus, and wherein other of said plurality of buses are not an infrared bus;
wherein the computing device is capably of perform different tasks in response to data received through a wireless-input-reception component than from the same data received through a wired-input-reception component while maintaining said first user-interface mode and not transitioning to said second user-interface mode.

* * * * *